3,745,101
ELECTROLYSIS OF DILUTE BRINE
John E. Currey, Morris P. Grotheer, and Edward H. Cook, Jr., Lewiston, N.Y., assignors to Hooker Chemical Corporation, Niagara Falls, N.Y.
Continuation-in-part of abandoned application Ser. No. 742,891, July 5, 1968. This application May 17, 1971, Ser. No. 144,208
Int. Cl. B01k 1/00; C01d 1/06
U.S. Cl. 204—98      8 Claims

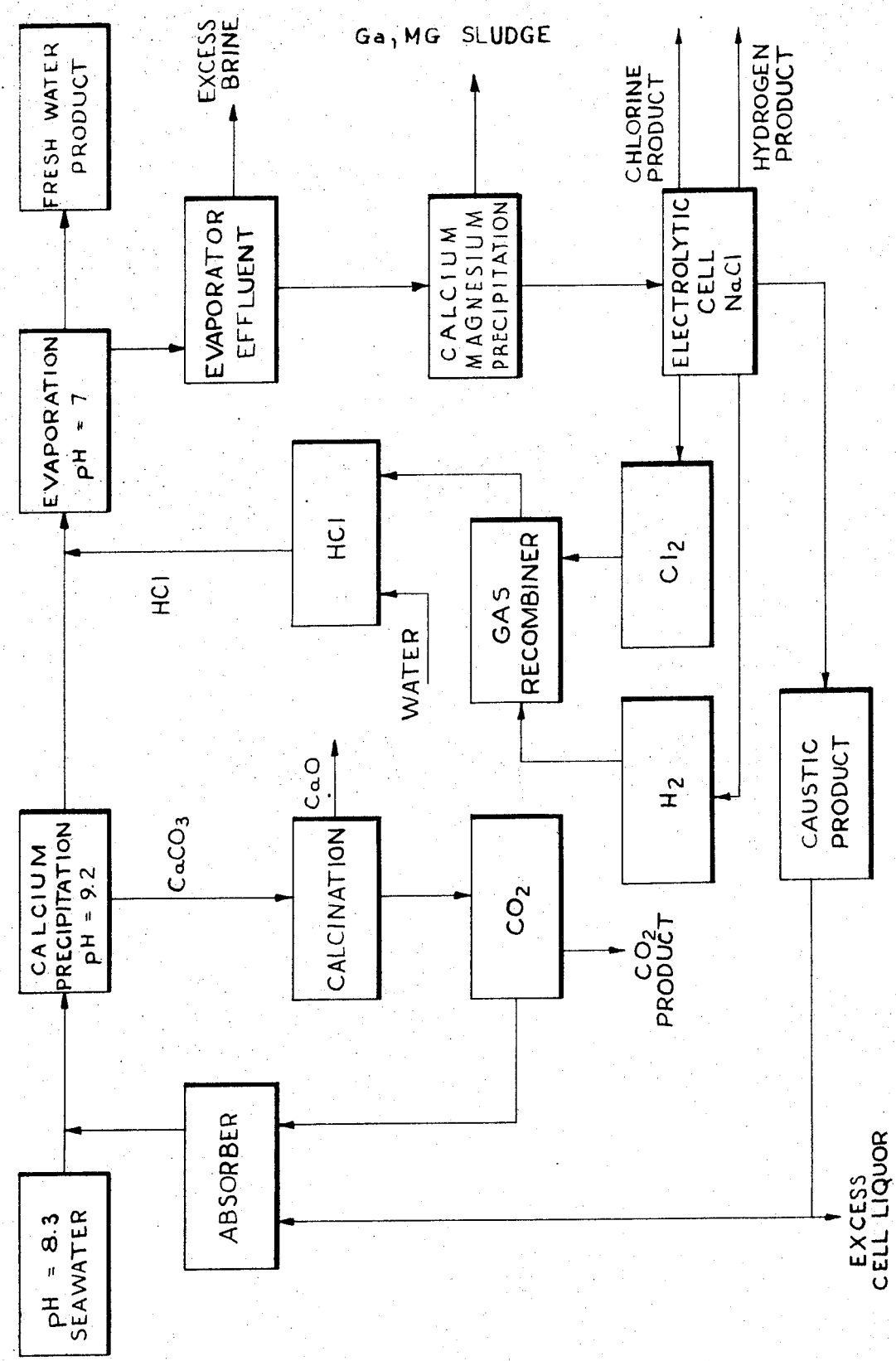

ABSTRACT OF THE DISCLOSURE

Dilute brines are electrolyzed to produce chlorine, sodium hydroxide and hydrogen in a diaphragm type chlor-alkali cell equipped with anodes having an active surface on an electrically conductive substrate metal. Applicable substrate metals are those metals and metal alloys which are passivated when polarized anodically and remain passive well beyond the anodic potential needed to convert a chloride ion to chlorine. The active surface on the substrate metal is a noble metal, alloys thereof or noble metal oxides alone or in combination with a noble metal.

The presence of relatively high concentrations of impurities such as sodium sulfate in the dilute brine can be tolerated without the characteristic anode current efficiency loss which attends the use of graphite anodes. Up to about 50 percent of the dilute feed brine can be converted to caustic cell liquor and still obtain acceptable performance of the cell. The electrolytic diaphragm cell equipped with anodes having an active surface on an electrically conductive substrate metal will operate with high anode current efficiencies (above about 93%) on very dilute cell feed brine in comparison to cells equipped with graphite anodes.

BACKGROUND OF THE INVENTION

This application is a continuation-in-part of application Ser. No. 742,891, filed July 5, 1968 now abandoned.

The economics of the diaphragm type electrolytic chlor-alkali cell operation in conventional operation today generally dictate the use of saturated or nearly saturated feed brines in a nearly pure state. In most instances, this requirement for nearly pure saturated brine is commercially satisfied by formulating the feed brine solution from well brine or crystalline salt of high purity; i.e., 95% or more of the salt content is NaCl; the brine is treated to remove calcium and magnesium to further purify the solution. However, sources of dilute impure brines abound on the earth making it highly desirable that techniques be developed to tap these supplies of cell feed brine as directly as possible, without large expenditure for purification and concentration.

Among the innumerable sources of dilute impure brines which present potential sources for diaphragm type chlor-alkali cell feed brines the following sources are exemplary:
(1) inland salt lakes such as the Dead Sea which contain brine of about 5 to 15 percent concentration
(2) brines resulting from partial concentration by solar evaporation or ion exchange membrane cells
(3) sea water made up to a concentration between about 5 to 15 percent sodium chloride
(4) dilute brine effluents from chemical operations such as those resulting from the reaction of sodium hydroxide with halogenated organic compounds in the production of alcohols, and
(5) dilute brines pumped from undergood brine pools.

These available brine sources present potential feed brines for diaphragm type chlor-alkali cells with impurities such as the sulfate, phosphate, nitrate and carbonate anions as well as organic impurities such as glycerine and its precursors. The objectionable inorganic anions may be characterized as highly hydrated oxygen containing anions.

BRIEF SUMMARY OF THE INVENTION

In accordance with this invention it has been discovered that under certain specific conditions impure dilute brines may be economically electrolyzed in a diaphragm type chlor-alkali cell equipped with anodes which present an active surface on an electrically conductive substrate metal. By substrate metal it is intended to encompass those metals and metal alloys which will become passivated when polarized anodically and remain passive well beyond the anodic potential needed to convert a chloride ion to chlorine. The phenomenon of passivity in this connection is discussed in an article by Greene appearing in the April 1962 issue of Corrosion-National Association of Corrosion Engineers, pp. 136t to 142t, wherein reference may be made to FIG. 1 which describes a typical active-passive transition of a metal toward a corrosive medium. The metal substrate employed in the electrodes applicable in this invention will not pass into the transpassive range until a potential is reached which is considerably higher than that needed to produce chlorine from the chloride ion. Hence, the substrate metal remains passive during the operation of the electrolytic cell.

Illustrative of the substrate metals in a generic sense are the "valve" metals (with the exclusion of certain metals which obviously are inapplicable such as aluminum, zirconium, and the like). Titanium, tantalum or niobium are acceptable substrate metals. The titanium employed is normally a commercially pure grade of titanium of intermediate strength. Alloys of titanium may be employed as long as the alloy meets the criterion of passivity set forth in the preceding paragraph. For example, titanium alloys of aluminum, vanadium, palladium, chromium or tin may be employed in which the latter metals are present as less than about 10 percent of the alloy.

The surface of the substrate metal may be made active by various methods. For example, a conductor such as a noble metal (preferably platinum) may be deposited on the surface of the substrate metal by methods known to the art. Mixtures of other noble metals and platinum may be used to activate the surface of the metal substrate. The preferred surface metal mixture or alloy is one containing more than about 50 percent platinum. Likewise, noble metal oxides may be used along or in combination with noble metals to form the active electrode surface. By noble metal, it is intended to include the platinum and palladium triads of the periodic table with the exclusion of osmium. Thus, ruthenium, rhodium, palladium, iridium and platinum represent noble metals which are especially applicable in their metallic form, alloys thereof and as oxides.

With specific reference to platinum-titanium eelctrodes or platinized titanium electrodes, the titanium substrate used is the commercially pure grade of intermediate strength or a titanium alloy of aluminum, vanadium, palladium, chromium or tin in which about 90 percent or more of the alloy is titanium. The platinum-titanium or noble metal oxide-titanium electrodes are acceptable as well as the platinum or noble metal oxide surfaced titanium or tantalum clad copper electrodes wherein the titanium or tantalum is applied to the copper core by mechanical coating or with electrically conductive adhesive materials.

The anodes may be assembled within the diaphragm type chlor-alkali cell in any manner known to the art. The anode current conductor connections may be isolated from the corrosive contents of the electrolytic cell by bituminous materials such as mastic or synthetic resin sealants. In this regard, an especially advantageous anode assembly is that disclosed by M. P. Grotheer in U.S. Pat. 3,563,878, issued Feb. 16, 1971, wherein an anode assembly is disclosed which is applicable to monopolar and bipolar chlor-alkali cell operation. The anode assembly provided therein is a unitary electrode assembly which involves a metallic (preferably steel) base plate or backer plate to which spacer bars of an electrically conductive material such as platinized-titanium, aluminum alloys and preferably copper is attached by welding or tinning to the steel at predetermined intervals based upon the desired ptich of the anodes. When the spacer bar is constructed from platinized titanium, the use of sealants may be dispensed with as protective means against attack by the corrosive materials which contact it. The spacer bar is disposed in such a manner that the attached anodes will be aligned with abutting edges vertically situated within the cell unit. The spacer bar contains holes through which pass the bolts running parallel to the base plate. The holes through the spacer bars are preferably slotted, at an angle downwardly extending from the vertical bar surface. The number of anodes that may be attached to the spacer bars by pressure bars depends upon the designed height of the cell where the anodes are horizontally attached to the spacer bar in a vertically disposed bank of anodes, or the cell width where the anodes are vertically attached to the spacer bar in a bank extending across the cell.

The pressure bars, one being drilled and countersunk, the other being provided with threaded holes, act, in conjunction with the bolt running through them, the anode and spacer bar, as an electrode clamping device. In the clamped position, the electrical resistance through the anode-spacer bar contact is a function of the pressure developed at the contacting surfaces. Hence, the resistance developed through the clamped connection of anode and spacer bar may be controlled by regulating the pressure applied by the clamping bolts. Consideration must also be given to the thermal expansion of the spacer bar during operation of the cell in which temperatures above 95° C. are common. In practice, the bolts may be of a suitable metal or metal alloy to compensate for the expansion of the spacer bars and pressure bars. Likewise, the pressure bars may be made of any suitable material such as steel.

Any corrosion resistant sealant known to the art may be placed over the connecting members between each electrode. For example, natural or synthetic rubbers may be employed by themselves, in combination or in conjunction with other resins. Bituminous materials may be employed if desired and the phenol-formaldehyde resins and polyester resins are acceptable sealants. Especially good sealants may be derived from the reaction of a polyhydric alcohol with a Diels-Alder adduct of hexahalocyclopentadiene and an alpha, beta unsaturated dicarboxylic acid, such as are disclosed in U.S. 3,216,884. The sealants employed in this invention may be advantageously highly filled with such materials as sand, $SiO_2$, graphite particles or other inert materials.

The electrolytic cells contemplated by this invention are those conventionally used in the electrolysis of sodium chloride solutions. The electrolytic cell comprises a cell top, a cell bottom, sidewalls, an anode compartment and a cathode compartment separated by a porous diaphragm which may be of deposited asbestos. The brine is fed into the anode compartment from which it flows through the diaphragm into the cathode compartment. Chlorine and hydrogen are withdrawn from the anode and cathode compartments, respectively. The cell liquor containing sodium hydroxide, sodium chloride and other impurities is withdrawn from the cathode compartment.

When employing a dilute brine feed in accordance with the instant invention, the feed rate may be that employed in conventional cell operation. However, it is preferred to introduce a dilute feed brine into the cell at a rate higher than that of flow through the diaphragm, while recycling the excess brine with makeup. The advantages of recycle are to maintain a relatively constant anolyte chloride concentration and pH. In operation, a dilute feed brine containing from about 3.5 to 15 percent alkali metal chloride is fed to the anode compartment of the diaphragm cell equipped with electrodes described above. An oxygen containing impurity present in the feed brine may appear in concentrations as high as about 5 percent of the total solids, based upon the sulfate ion. To achieve satisfactory current efficiency the conversion of brine to caustic should be kept below 50 percent of the original brine feed concentration. Hence, the caustic concentration in the catholyte will vary between about 15 to 100 grams per liter. The electrolytic cell may be efficiently operated within the temperature range of about 80° C. up to the boiling point of the brine (which depends upon the brine concentration). The anode current density of the operating electrolytic cell is preferably greater than 0.8 ampere per square inch.

Control of the conversion of brine to caustic to below about 50 percent of the original brine feed conversion may be accomplished in a known manner. For example it is known that the feed rate of the brine through the diaphragm can be used to control the concentration of caustic produced in the cell liquor. A slower flow through the diaphragm increases the concentration of caustic in the produced cell liquor and conversely a faster flow decreases the concentration of caustic in the produced cell liquor. Accordingly this flow rate should be relatively fast, i.e., sufficient to achieve a conversion of brine to caustic of at most 50 percent of the original brine feed concentration and preferably between about 15 percent and about 45 percent of the original brine feed concentration.

The brine flow rate can be controlled by means of the hydrostatic head of the brine liquor flowing into the electrolytic cell, by the porosity of the asbestos diaphragm sparating the anolyte and catholyte compartments and by the amperage applied across the cathode surface.

Most conveniently, the brine flow rate may be controlled by utilizing as the diaphragm one which is fabricated of a mixture of fibrous asbestos comprising a major proportion of anthophyllite and a minor proportion of a second type of asbestos for example, chrysotile. Asbestos diaphragms comprising anthophyllite asbestos are disclosed and claimed in U.S. 3,505,200.

As indicated in U.S. 3,505,200 with diaphragms containing a major amount of anthophyllite of 0.3 to 0.6 pound per square foot of cathode, flow rates of brine feed through the diaphragm of from about 44 to 1850 cc. per minute per square foot at 10 in. hydrostatic head can be obtained.

It is also indicated in this patent (see Examples 9–14) that as the current density measured at the cathode surface is increased the caustic conversion increases.

Accordingly, as the current density measured at the cathode surface is increased, the flow rate may be increased to control the rate of conversion of brine to caustic. This may be accomplished by increasing the anthophyllite content of the diaphragm or reducing the diaphragm weight per square foot of cathode.

As an example of a specific application of the instant invention, its integration with a sea water desalination operation involves:

(1) Treatment of sea water with an alkaline-carbonate containing solution to precipitate a portion of the dissolved calcium as calcium carbonate, (2) Adjustment of the pH of the treated sea water to about neutrality, (3) Evaporation to recover potable water, (4) Treatment of the brine feed recovered from step (3) for the electrolytic cell with an alkaline-carbonate containing solution to remove calcium and magnesium as the carbonate and hydroxide, respectively, (5) Electrolysis of the treated brine directly or optionally after further concentration of brine or addition of make up sodium chloride to produce hydrogen, chlorine, and caustic cell liquor, (6) Recombination of a portion of the hydrogen and chlorine generated in step (5) to form hydrochloric acid for use in step (2), supra, (7) Calcination of calcium carbonate precipitated in steps (1) and/or (4) to produce calcium oxide and carbon dioxide, (8) Combination of the sodium hydroxide containing caustic product of step (5) with carbon dioxide from step (7) to produce an alkaline carbonate containing mixture for treatment of sea water specified in steps (1) and (4).

The effluent from a desalination process contains sodium chloride in concentrations generally above 3.5% by weight and normally within the range of 7 to 12% by weight. This effluent also contains sodium sulfate in a concentration from about 1% to up to about 5% and normally within the range of 3 to 4% by weight of total solids. This effluent has generally in the past been discarded as a worthless by-product of water desalination.

The presence of sodium sulfate in the effluent from the water desalination process, in concentrations of from about 1 to about 5% of total solids by weight makes this effluent unsuitable for electrolysis in the usual diaphragm chlor-alkali cell because of low current efficiencies. However, the sulfate containing effluent from a desalination operation may be used as the source of dilute brine in the performance of the instant invention.

The preliminary treatment of sea water with partially or totally carbonated cell liquor serves to precipitate a portion of the dissolved calcium. Subsequent correction of the pH of the sea water to near neutrality before it is introduced into the evaporator affords such a decrease in calcium content that a larger percentage of potable water may be removed from a given amount of sea water before scaling begins.

The economically advantageous on-site availability of an alkaline-carbonate containing reagent for pre-treatment of sea water, coupled with the advantage of utilizing the evaporator effluent to produce valuable products makes this process decidedly superior to present operations.

DETAILED DESCRIPTION OF THE INVENTION

An integrated saline water conversion plant-effluent electrolysis operation herein described may best be understood by reference to the accompanying drawing which is self-explanatory.

A series of experiments was run to determine the effect of anolyte sodium chloride concentration on both anode current efficiency and on cell voltage. Both graphite anodes and platinized-titanium anodes were used.

To illustrate the electrolysis of dilute feed brines contaminated with an oxygen containing a brine made from synthetic-sea-water salt was chemically treated with caustic and carbonate to precipitate calcium and magnesium. After treatment, this brine contained 314 grams per liter sodium chloride, 3.8% by weight based on total solids sodium sulfate, 12 parts per million calcium oxide, and 7 parts per million magnesium oxide. This solution and treated plant brine containing a corresponding amount of sodium sulfate was used for the laboratory test. In these experiments a laboratory size version of a Hooker type diaphragm cell was used. Anode current densities were maintained at 0.9 ampere per square inch. The diaphragm was composed of chrysotile asbestos and was applied to the cathode in the amount of 0.2 to 0.4 pound per square foot of cathode. A flow rate of brine through the diaphrgam of 20–30 cubic centimeters per minute per square foot at 10 inches hydrostatic head was initially provided and the rate was maintained substantially constant by the gradual increase in the hydrostatic head in the anolyte compartment.

All the experiments were started using in excess of 300 grams per liter (g.p.l.) sodium chloride in the brine. During the course of the experiments, approximately 2 weeks, the brine was diluted with distilled water to obtain data at the lower salt concentrations. The ratio of sodium sulfate to sodium chloride would remain constant as a result of these dilutions. The data collected in the following Tables I and II represents examples of the use of platinized-titanium anode( Type B-Englehard Coating). The platinized-titanium anodes were bolted directly to a copper bus current conductor. A highly filled polyester was used as the sealant to insulate the anode connection from the anolyte.

TABLE I

Platinized titanium anode (0.9 ampere per square inch)

| Feed brine | | Anolyte | | Catholyte | | Temp., °C. | Cell voltage | Anode gas | | | Percent current efficiency |
|---|---|---|---|---|---|---|---|---|---|---|---|
| G.p.l. NaCl | pH | G.p.l. NaCl | pH | G.p.l. NaCl | G.p.l. NaOH | | | $CO_2$ | $O_2$ | CO | |
| 314 | 6.25 | 264 | 2.95 | 224 | 58 | 92 | 2.9 | 1.71 | .76 | ------ | 98.3 |
| 274 | 7.25 | 248 | 2.8 | 205 | 78 | 95 | 3.0 | .65 | .24 | ------ | 99.2 |
| 231 | 7.5 | 201 | 2.8 | 145 | 66 | 93 | 3.05 | .68 | 1.59 | ------ | 96.6 |
| 211 | 6.8 | 165 | 3.45 | 125 | 64 | 93 | 3.15 | .25 | .18 | ------ | 99.6 |
| 173 | 6.5 | 137 | 3.8 | 90 | 72 | 96.5 | 3.2 | .57 | 1.39 | ------ | 97.0 |
| 152 | 6.5 | 120 | 3.85 | 76 | 66 | 96 | 3.3 | .39 | .94 | ------ | 97.3 |
| 124 | 6.8 | 86 | 3.8 | 52 | 62 | 95 | 3.45 | .41 | 1.84 | ------ | 95.8 |
| 140 | 6.7 | 105 | 3.75 | 65 | 61 | 94 | 3.35 | .34 | .94 | ------ | 97.9 |
| 136 | 7.1 | 91 | 3.7 | 61 | 62 | 93 | 3.4 | .44 | 1.73 | ------ | 96.5 |
| 136 | 6.7 | 91 | 3.5 | 51 | 59 | 93 | 3.45 | .39 | 1.81 | ------ | 96.2 |
| 133 | 6.6 | 83 | 3.7 | 48 | 62 | 95 | 3.45 | .20 | 1.90 | ------ | 93.8 |
| 129 | 7.2 | 87 | 3.7 | 49 | 58 | 96 | 3.45 | .36 | 1.09 | ------ | 97.8 |
| 144 | 6.8 | 92 | 3.4 | 65 | 56 | 96 | 3.45 | .47 | 1.29 | ------ | 97.4 |
| 132 | 7.2 | 92 | 3.7 | 50 | 61 | 97 | 3.45 | .43 | 1.16 | ------ | 96.9 |
| 135 | 7.3 | 92 | 3.6 | 53 | 62 | 96 | 3.45 | .43 | 1.7 | ------ | 95.8 |
| 132 | 7.2 | 90 | 3.9 | 50 | 63 | 96 | 3.5 | .36 | 1.23 | ------ | 97.3 |

NOTE.—Initial feed brine contains 3.8 percent $Na_2SO_4$. Source of $CO_2$ gas comes from feed brine.

TABLE II

Platinized titanium anode (0.9 ampere per square inch)

| Feed brine | | Anolyte | | Catholyte | | Temp., °C. | Cell voltage | Anode gas | | | Percent current efficiency |
|---|---|---|---|---|---|---|---|---|---|---|---|
| G.p.l. NaCl | pH | G.p.l. NaCl | pH | G.p.l. NaCl | G.p.l. NaOH | | | $CO_2$ | $O_2$ | CO | |
| 315 | 7.0 | 281 | 3.0 | 264 | 43 | 91 | 2.85 | 1.77 | .18 | | 99.4 |
| 304 | 7.3 | 290 | 4.3 | 246 | 43 | 94 | 2.75 | 1.84 | .17 | | 99.6 |
| 295 | 7.5 | 271 | 4.4 | 243 | 41 | 95 | 2.75 | .38 | .23 | | 99.5 |
| 298 | 7.0 | 275 | 4.5 | 245 | 43 | 96 | 2.75 | 1.23 | .19 | | 99.0 |
| 185 | 6.8 | 165 | 4.3 | 138 | 39 | 94 | 2.85 | .42 | .86 | | 97.8 |
| 146 | 6.5 | 128 | 4.2 | 99 | 39 | 94 | 2.9 | .12 | 1.62 | | 94.4 |
| 147 | 7.4 | 127 | 3.7 | 99 | 40 | 95 | 3.0 | .70 | .52 | | 98.9 |
| 112 | 6.4 | 91 | 3.8 | 67 | 37 | 94 | 3.1 | 1.57 | .83 | | 98.3 |
| 103 | 7.4 | 81 | 3.9 | 52 | 40 | 95 | 3.2 | .71 | .75 | | 98.4 |
| 81 | 7.4 | 56 | 4.0 | 22 | 42 | 97 | 3.55 | .84 | 3.0 | | 93.5 |
| 81 | 7.4 | 48 | 4.1 | 19 | 51 | 96 | 3.7 | 1.02 | 6.39 | | 87.2 |
| 72 | 7.5 | 36 | 4.3 | 16 | 52 | 97 | 4.4 | 1.10 | 6.60 | | 86.7 |
| 73 | 7.7 | 38 | 4.1 | 26 | 35 | 98 | 4.6 | 1.22 | 8.45 | | 83.3 |
| 79 | 2.7 | 36 | 4.1 | 22 | 47 | 97 | 4.6 | 1.84 | 17.4 | | 69.7 |

The following experimental data was obtained in conjunction with the use of a Hooker type diaphragm cell employing graphite anodes which were cast in lead employing a copper bus current conductor as is conventional in this art.

TABLE III

Graphite anode—Electrical connection cast in lead (0.9 amperes per square inch)

| Feed brine | | Anolyte | | Catholyte | | Temp., °C. | Cell voltage | Anode gas | | | Percent current efficiency |
|---|---|---|---|---|---|---|---|---|---|---|---|
| G.p.l. NaCl | pH | G.p.l. NaCl | pH | G.p.l. NaCl | G.p.l. NaOH | | | $CO_2$ | $O_2$ | CO | |
| 314 | 7.7 | 284 | 1.8 | 264 | 48 | 95 | 3.2 | 2.15 | .07 | | 95.7 |
| 300 | 7.7 | 265 | 1.8 | 231 | 78 | 95 | 3.2 | 1.65 | .76 | | 95.2 |
| 238 | 7.3 | 215 | 1.7 | 172 | 64 | 93 | 3.3 | 2.33 | 1.7 | | 92.3 |
| 198 | 7.7 | 168 | 1.7 | 135 | 62 | 92 | 3.5 | 3.89 | .43 | .20 | 91.2 |
| 149 | 7.5 | 102 | 2.6 | 89 | 64 | 97 | 3.55 | 9.43 | 2.32 | .40 | 78.4 |
| 158 | 7.6 | 108 | 2.7 | 40 | 98 | 97 | 3.6 | 8.91 | 2.37 | .36 | 88.3 |
| 136 | 7.8 | 82 | 2.4 | 40 | 80 | 93 | 3.65 | 6.20 | 2.12 | .50 | 83.5 |
| 139 | 7.6 | 92 | 2.1 | 46 | 78 | 94 | 3.65 | 8.81 | 1.62 | .55 | 80.3 |
| 121 | 7.8 | 75 | 2.1 | 43 | 70 | 94 | 3.8 | 13.15 | 1.60 | .68 | 73.1 |
| 81 | 7.9 | 40 | 1.75 | 13 | 44 | 96 | 4.3 | 17.19 | 1.56 | 1.07 | 66.9 |
| 81 | 7.7 | 41 | 1.4 | 9 | 54 | 97 | 4.4 | 14.26 | 1.32 | 1.43 | 70.6 |

It may be readily seen from the results obtained by the use of a platinized-titanium anode, the results of which are compiled in Tables I and II, that high anode current efficiencies, above 93%, were obtained down to an anolyte sodium chloride concentration of 60 to 70 grams per liter. Below anolyte cell concentrations of 50 grams per liter sodium chloride, or as the conversion of sodium chloride in the feed to caustic soda increased to above about 50%, anode current efficiencies decreased rapidly.

Higher current efficiencies observed with platinized-titanium anodes at lower anolyte sodium chloride concentrations may be explained as a result of the higher oxygen overvoltage on platinum when compared to graphite, and by the fact that carbon complexes form with some oxygen containing anions such as sulfate and phosphate or graphite anodes and accelerate graphite consumption.

The compiled data set forth in Table III illustrates the use of a graphite anode to exemplify an accelerated graphite consumption in the presence of sodium sulfate which adversely affects the anode efficiency. Carbon dioxide to oxygen ratios ranged from 2:1 to 22.1, even the anode current efficiencies were above 95%. At current efficiencies of 95% or greater, the graphite consumption was calculated to be between 6 to 14 lbs. per ton of chlorine. At an anode efficiency of 90% (150 grams per liter sodium chloride in anolyte), the graphite consumption was about 20 lbs. per ton of chlorine. Below an anolyte concentration of 120 grams per liter sodium chloride, and as the conversion of sodium chloride to caustic increased to above 50% of the chloride concentration of the feed the graphite consumption increased to between 30 and 100 lbs. per ton of chlorine.

In contrast to high and uneconomical graphite loss, the loss rate from the noble metal electrodes was under 2 grams per ton of chlorine. During this experiment, conditions were maintained whereby noble metal loss was held at a rate between 0.1 and 2 grams per ton of chlorine; this level of noble metal consumption produces chlorine and its by-products at costs acceptable to a commercial plant. To minimize platinum losses, rectifiers are chosen which will provide a minimum percentage ripple in the direct current.

Similarly, it was found that by operating under the conditions specified that cell voltages were obtained ranging from 3.2 to 4.4 volts at the current density of 0.9 ampere per square inch. The voltages obtained are sufficiently low to make commercial operations economically feasible.

In each of the series of experiments tabulated in Tables I through III, voltages increased as the anolyte sodium chloride concentration decreased. Cell voltages associated with platinized-titanium anodes are lower than those associated with graphite anodes. The voltage increase, as the anolyte salt concentration decreases, appears to be independent of the type of anode used. The current efficiencies are based on gas analysis and are not corrected for chlorine lost due to the solubility of chlorine in the anolyte or the resultant chlorate in the catholyte.

For equivalent conditions, the anolyte pH was higher in experiments using platinized-titanium anodes than in experiments using graphite anodes.

Having disclosed the invention it will be apparent to those skilled in the art that various modifications and changes may be made which do not depart from the true spirit of this contribution.

What is claimed is:

1. In a process for the electrolysis of a dilute brine solution in a diaphragm type electrolytic cell, at a temperature between about 80 degrees centigrade and the boiling point of said solution, which comprises applying a decomposition voltage across said solution between a cathode and an anode to afford an anode current density of at least 0.9 ampere per square inch, said anode comprising (a) a metal substrate selected from the group consisting of titanium, tantalum, niobium, titanium-clad copper, tantalum-clad copper, niobium-clad copper, and alloys of titanium in which less than about 10 percent of said alloy is a member of the group consisting of aluminum, vanadium, chromium, palladium, tin and mixtures thereof; and (b) an active surface selected from at least one member of the group consisting of a noble metal and a noble metal oxide, the improvement which comprises employing as said brine solution an aqueous solution containing from 3.5 to about 15 percent alkali metal chloride and from 1 to about 5 percent of total solids of an oxygen containing impurity, expressed as sodium sulfate, said impurity comprising at least one member selected from the group consisting of the anions sulfate, phosphate, carbonate, nitrate and organic materials, and flowing said brine solution through said diaphragm at a rate sufficient to electrolyze less than 50 percent of the alkali metal chloride in said brine solution, to produce a catholyte containing from 15–100 grams per liter alkali metal hydroxide.

2. The process of claim 1 in which the flow rate of the brine solution through said diaphragm is such as to electrolyze from about 15 to about 45 percent of the alkali metal chloride in said brine solution.

3. A process for the production of chlorine, caustic and hydrogen comprising
  (a) adjusting the pH of an alkali metal chloride brine containing calcium, magnesium and sulfate impurities with an alkaline-carbonate containing reagent to partially precipitate calcium carbonate,
  (b) acidification of the brine from step (a) to obtain a near neutral pH,
  (c) concentration of the brine to produce a solution containing between about 5 to 15 percent alkali metal chloride,
  (d) precipitation of the remaining calcium and magnesium as the carbonate and hydroxide, respectively, from at least a portion of said solution by treatment with an alkaline-carbonate containing reagent to produce a treated solution containing from 1 to 5 percent of the total solids of an oxygen containing impurity, expressed as sodium sulfate, said impurity comprising at least one member selected from the group consisting of the anions sulfate, phosphate, carbonate, nitrate and organic material,
  (e) electrolysis of the treated solution to produce chlorine, caustic and hydrogen in a diaphragm type electrolytic cell at a temperature between about 80° C. to the boiling point of said solution to produce an alkali metal hydroxide concentration in the catholyte equivalent to less than 50 percent conversion of the alkali metal chloride, said electrolytic cell being equipped with anodes comprising
    (1) a metal substrate selected from the group consisting of titanium, tantalum, niobium, titanium-clad copper, and alloys of titanium in which less than about 10 percent of said alloy is a member of the group consisting of aluminum, vanadium, chlorium, palladium, tin and mixtures thereof; and
    (2) an active surface selected from at least one member of the group consisting of a noble metal and noble metal oxide.

4. The process of claim 3 in which the hydrogen produced in the electrolysis step (e) is recombined with chlorine from step (e) to produce HCl which is used to acidify the brine in step (b).

5. The process of claim 3 in which the calcium carbonate precipitated in step (a) is calcined to produce CaO and $CO_2$ and the $CO_2$ is reacted with a portion of the caustic produced in step (e) to produce an alkaline $Na_2CO_3$ containing solution which is recycled to adjust the pH in step (a) and precipitate calcium and magnesium values in step (d).

6. The process of claim 3 in which the alkali metal chloride brine of step (a) is sea water.

7. The process of claim 3 in which the step (c) concentration is by evaporation to produce potable water.

8. An integrated process of water desalination and brine electrolysis which comprises supplying the dilute effluent containing from about 5 to 15 percent alkali metal chloride and from 1 to about 5 percent of total solids of an oxygen containing impurity, expressed as sodium sulfate from a water desalination process from which calcium and magnesium have been removed to a diaphragm type chlor-alkali cell, equipped with anodes comprising
  (a) a metal substrate selected from the group consisting of titanium, tantalum, niobium, titanium-clad copper, tantalum-clad copper, niobium-clad copper, and alloys of titanium in which less than about 10 percent of said alloy is a member of the group consisting of aluminum, vanadium, chromium, palladium, tin and mixtures thereof; and
  (b) an active surface selected from at least one member of the group consisting of a noble metal and noble metal oxide, electrolyzing said dilute effluent, reacting at least a portion of the caustic product with $CO_2$ to produce an alkaline $Na_2CO_3$ containing solution for precipitating calcium and magnesium and reacting at least a portion of the chlorine and hydrogen from the electrolytic cell to form hydrochloric acid for use to adjust the pH of the water to be desalinated prior to evaporation, to produce potable water, chlorine ad caustic, the latter in amount equivalent to less than 50 percent of the alkali metal chloride in said dilute effluent.

References Cited
UNITED STATES PATENTS

| 3,250,691 | 5/1966 | Broun et al. | 204—98 |
| 3,654,104 | 4/1972 | Yoshida et al. | 204—98 |
| 3,177,131 | 4/1965 | Angell et al. | 204—98 |
| 3,051,637 | 8/1962 | Judice et al. | 204—98 |
| 3,329,595 | 7/1967 | Barbato et al. | 204—99 |

JOHN H. MACK, Primary Examiner

D. R. VALENTINE, Assistant Examiner

U.S. Cl. X.R.
204—128, 129